US008194290B2

(12) United States Patent
Kuo

(10) Patent No.: US 8,194,290 B2
(45) Date of Patent: Jun. 5, 2012

(54) IMAGE COMPENSATION METHOD WITH CORRECTIONAL GRAY LEVEL VALUES OF COMPLETE BLACK AND/OR WHITE

(75) Inventor: Shih-Zheng Kuo, Taipei (TW)

(73) Assignee: Transpacific Systems, LLC, Wilmington, DE (US)

( * ) Notice: Subject to any disclaimer, the term of this patent is extended or adjusted under 35 U.S.C. 154(b) by 1019 days.

(21) Appl. No.: 10/662,258

(22) Filed: Sep. 15, 2003

(65) Prior Publication Data

US 2004/0085594 A1 May 6, 2004

(30) Foreign Application Priority Data

Oct. 30, 2002 (TW) ................................ 91132212 A

(51) Int. Cl.
*H04N 1/04* (2006.01)
*G06K 9/00* (2006.01)

(52) U.S. Cl. ......... 358/474; 358/1.9; 358/2.1; 358/3.01; 358/3.03; 358/3.02; 358/3.06; 358/406; 358/408; 358/496; 358/504; 358/505; 382/149; 382/141; 382/154; 382/169; 382/175; 382/237; 382/251; 382/266; 382/274; 382/318; 347/41; 347/15; 347/79; 347/179; 347/233; 347/235; 347/250

(58) Field of Classification Search ................ 358/3.01, 358/2.1, 3.03, 406, 474, 1.9, 3.02, 505, 506, 358/408, 487, 496, 3.06; 382/251, 169, 237, 382/167, 149, 141, 154, 175, 266, 274, 318; 348/254, 518, 671, 747, E5.034, E5.036; 347/41, 15, 79, 233, 235, 250

See application file for complete search history.

(56) References Cited

U.S. PATENT DOCUMENTS

| 3,952,144 | A | * | 4/1976 | Kolker ........................... 358/406 |
| 4,174,528 | A | * | 11/1979 | White ........................... 358/464 |
| 5,050,231 | A | * | 9/1991 | Watanabe et al. ............. 382/259 |
| 5,091,654 | A | * | 2/1992 | Coy et al. .................. 250/559.29 |
| 5,321,501 | A | * | 6/1994 | Swanson et al. .............. 356/479 |
| 5,331,428 | A | * | 7/1994 | Uffel ............................ 358/446 |
| 5,404,232 | A | * | 4/1995 | Selby ........................... 358/406 |
| 5,515,180 | A | * | 5/1996 | Maeda et al. ................ 358/3.15 |
| 5,621,217 | A | * | 4/1997 | Seachman et al. ......... 250/559.1 |
| 5,644,409 | A | * | 7/1997 | Irie et al. ....................... 358/461 |
| 6,178,015 | B1 | * | 1/2001 | Lee et al. ..................... 358/486 |
| 6,198,845 | B1 | * | 3/2001 | Tse et al. ..................... 382/169 |
| 6,233,011 | B1 | * | 5/2001 | Su ................................. 348/254 |
| 6,445,469 | B1 | * | 9/2002 | Horiuchi et al. ............. 358/406 |
| 6,452,631 | B1 | * | 9/2002 | Hsu et al. ..................... 348/254 |
| 6,480,306 | B1 | * | 11/2002 | Chien .......................... 358/509 |
| 6,658,164 | B1 | * | 12/2003 | Irving et al. ................. 382/274 |

(Continued)

*Primary Examiner* — Steven Kau

(74) *Attorney, Agent, or Firm* — Stolowitz Ford Coweger LLC

(57) ABSTRACT

An image compensating method. First, multiple scanning lines are used to scan a document and a longitudinal black and white pattern, in order to produce the actual gray level value for multiple pixels with respect to each of the scanning lines and the document, as well as a correctional gray level value for complete black and a correctional gray level value for complete white with respect to the longitudinal black and white pattern. Then, the compensational gray level value with respect to the actual gray level value for each of the pixels is obtained according to the correctional gray level value for complete black, the correctional gray level value for complete white, the theoretical gray level value for complete black, the theoretical gray level value for complete white, and the actual gray level value for each of the pixels. Then, the procedure is complete.

17 Claims, 4 Drawing Sheets

U.S. PATENT DOCUMENTS 6,753,982 B1 * 6/2004 Sheng et al. .................. 358/474
6,975,775 B2 * 12/2005 Rykowski et al. ............ 382/254
7,126,728 B2 * 10/2006 Tseng et al. .................. 358/497
7,492,488 B2 * 2/2009 Liu ............................... 358/406

* cited by examiner

IMAGE COMPENSATION METHOD WITH CORRECTIONAL GRAY LEVEL VALUES OF COMPLETE BLACK AND/OR WHITE

This application claims the benefit of Taiwan application Serial No. 091132212, filed Oct. 30, 2002.

BACKGROUND OF THE INVENTION

1. Field of the Invention

This invention relates to an image compensating method, and more particularly, the invention relates to an image compensating method that can use the correctional gray level value of complete black or white, which is measured from the patterns of longitudinal black and white, complete white, or complete black, and that can compare the correctional gray level values with the theoretical gray level values of the complete black or white, so as to adjust the brightness of the scanned image.

2. Description of Related Art

FIG. 1 is a perspective view schematically illustrating a conventional scanner 100. As shown in FIG. 1, the scanner 100 includes a base 102 and a cover 104, in which one end of the cover 104 is connected with an end of the base 102 via a hinge device 106 so that the cover 104 can be opened and closed on the base 102.

The base 102 includes a top 108, a scanning platform 110, a chassis 114, a transverse complete white pattern 116, and the top 108, which is located on the base 102. The scanning platform 110 can also be situated on the top 108, so as to align a document 112. Wherein, the chassis 114 is located inside of the base 102 in a movable manner, so that the chassis 114 can be moved along the direction of arrow 105 in order to scan the document 112, as shown in FIG. 1, when the cover 104 and the base 102 are closed. In addition, the transverse complete white pattern 116 is located on an inner wall of the top 108 near an end of the scanning platform 110 and is used to allow the scanner 100 to perform a correction on the image before the chassis 114 starts to scan the document 112. A gray level correction value is obtained and is used as the standard for adjusting the gray level value of the image when the chassis 114 of the scanner 100 begins scanning the document 112.

It should be noted that when the chassis 114 of the scanner 100 scans the document 112, the gray level value of the image could be adjusted according to the correctional gray level value. However, the intense light needed for the scanning operation and the scattering light in the environment during the scanning process can affect the gray level value of the image after the chassis 114 scans the document to obtain the gray level value of the image. Due to the faulty condition created by the light brightness error, the obtained gray level value of the image cannot be adjusted according to the correctional gray level value. This also causes a distortion on the image obtained by the scanner and consequently has a large effect on the image quality.

SUMMARY OF THE INVENTION

It is therefore an object of the present invention to provide an image compensating method. By comparing the correctional gray level value of complete black or complete white, which is the measurement on the patterns of longitudinal black and white, complete white, or complete black, with a theoretical gray level value of complete black or complete white, the image brightness obtained by the scanner is adjusted. At the same time, the light brightness errors that occur due to the light intensity needed by the scanning operation or due to the disturbance created by light scattering in the environment can be compensated. Additionally, the scanning quality can be maintained at a high level.

In accordance with the foregoing and other objects of the present invention, the invention provides an image compensating method. First, multiple scanning lines are used to scan a document and a longitudinal black and white pattern, in order to produce the actual gray level value for each of the multiple pixels with respect to each of the scanning lines and the document, and a correctional gray level value for complete black and a correctional gray level value for complete white with respect to the longitudinal black and white pattern. Then, a compensational gray level value with respect to the actual gray level value for each of the pixels is obtained according to the correctional gray level values for complete black, the correctional gray level value for complete white, the theoretical gray level values for complete black, the theoretical gray level value for complete white, and the actual gray level value for each of the pixels. Then, the process is complete.

In accordance with the foregoing and other objects of the present invention, the invention provides another image compensating method. First, multiple scanning lines are used to scan a document and a longitudinal complete white pattern, in order to produce the actual gray level value for each of the multiple pixels with respect to each of the scanning lines and the document, and a correctional gray level value for complete white with respect to the longitudinal complete white pattern. Then, a compensational gray level value with respect to the actual gray level value for each of the pixels is obtained according to the correctional gray level value for complete white, the theoretical gray level value for complete white, and the actual gray level value for each of the pixels. Then, the process is complete.

In accordance with the foregoing and other objects of the present invention, the invention further provides another image compensating method. First, multiple scanning lines are used to scan a document and a longitudinal complete black pattern, in order to produce the actual gray level value for each of the multiple pixels with respect to each of the scanning lines and the document, and a correctional gray level value for complete black with respect to the complete black longitudinal pattern. Then, a compensational gray level value with respect to the actual gray level value for each of the pixels is obtained according to the correctional gray level value for complete black, the theoretical gray level value for complete black, and the actual gray level value for each of the pixels. Then, the process is complete.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

Figure 1:
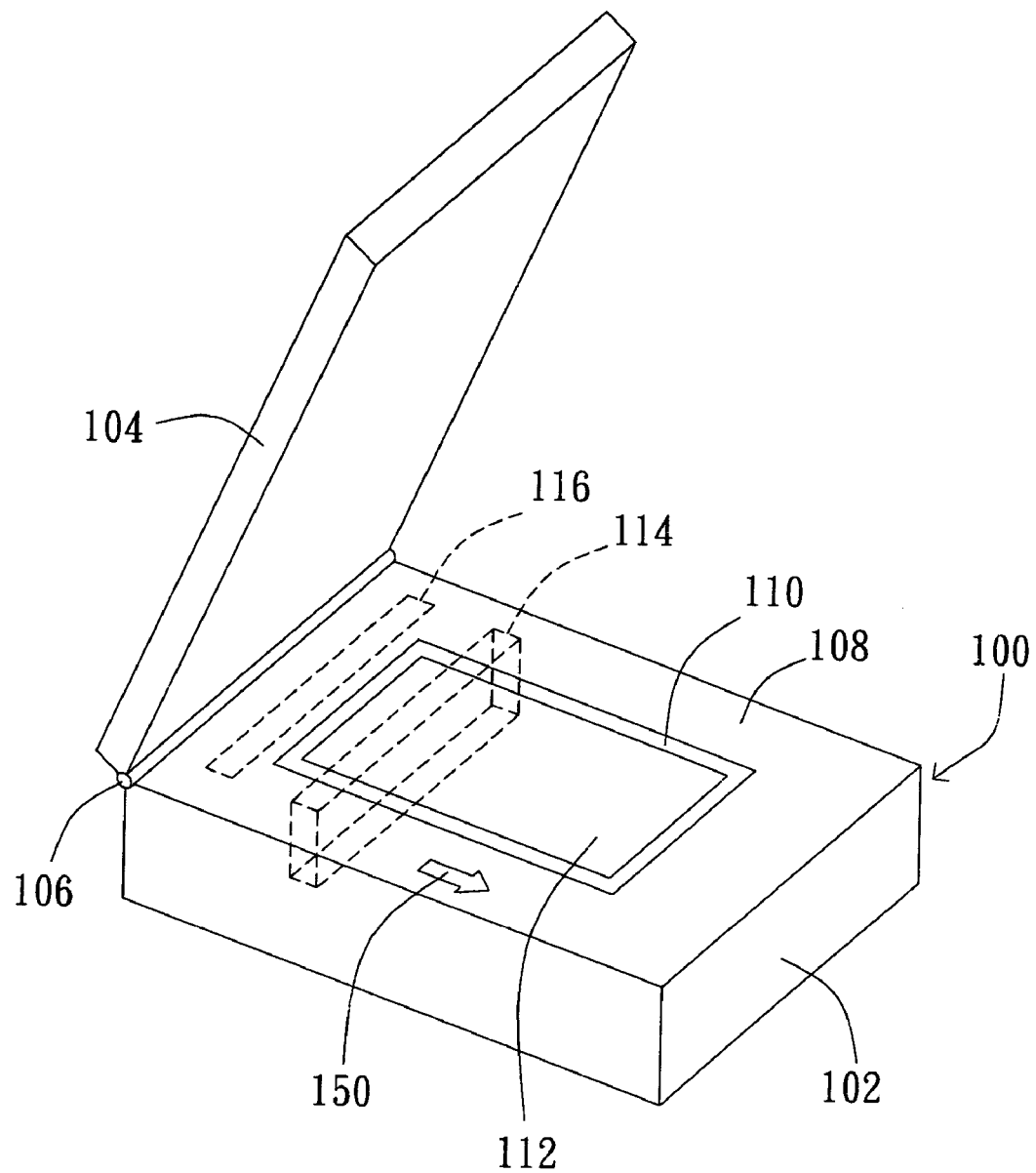
FIG. 1 (prior art) is a perspective view schematically illustrating a conventional scanner.
Figure 2:
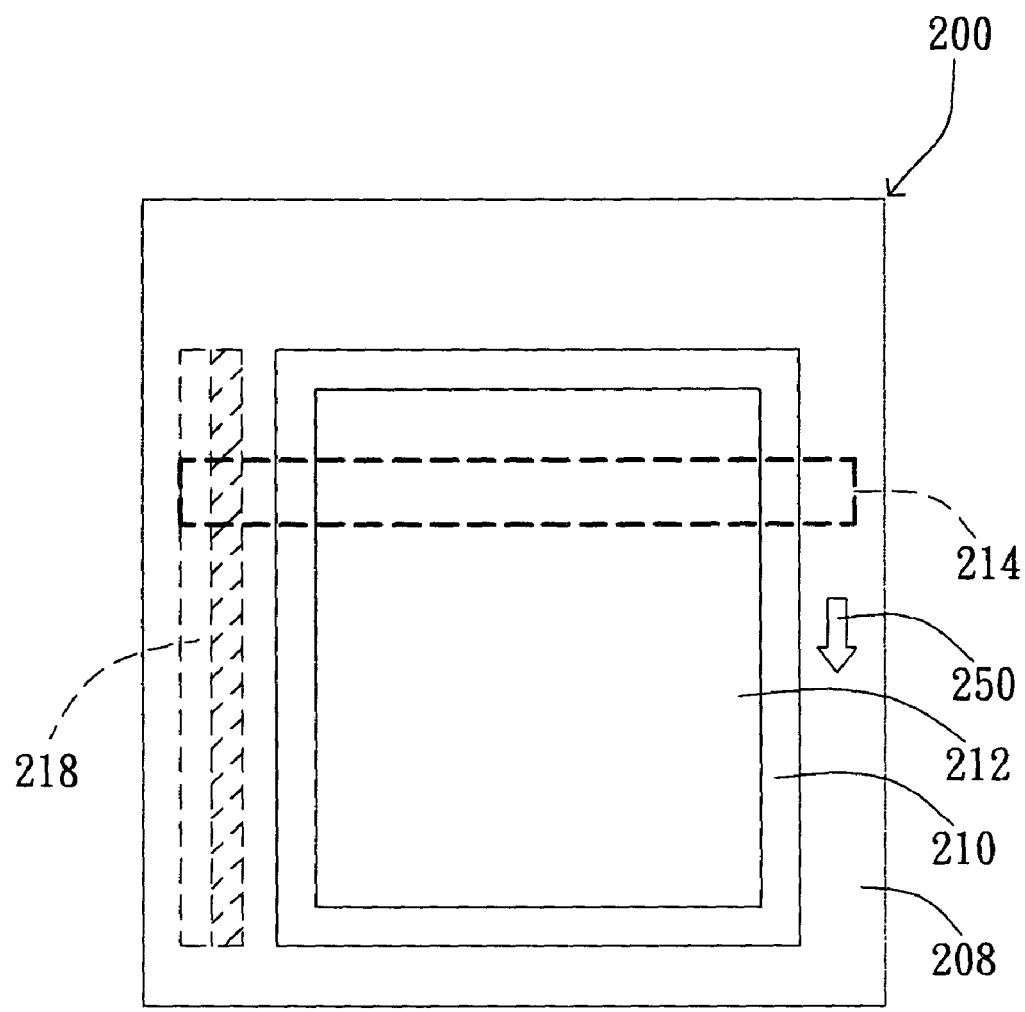
FIG. 2 is a drawing schematically illustrating a scanner with a longitudinal black and white pattern according to the preferred embodiment of the present invention.

FIG. 2 is a drawing schematically illustrating a scanner with a longitudinal black and white pattern according to the preferred embodiment of the present invention. As shown in FIG. 2, the scanner 200 at least includes a top 208, a scanning platform 210, a chassis 214, and a longitudinal black and white pattern 218. Wherein, the scanning platform 210 is located on the top 208, so as to be aligned with a document. The chassis 214 can be moved under the top 208 so that the chassis 214 can be moved forward and backward in the direction indicted by the arrow 250 in FIG. 2. As a result, the document 212 and the longitudinal black and white pattern 218 can be scanned.

In this embodiment, the longitudinal black and white pattern 218 is specifically located on an inner wall of the top 208 on a side near the scanning platform 210 to allow the scanner 200 to perform image brightness compensation when the chassis 214 scans the document 212. Besides, the longitudinal black and white pattern 218 has a length greater than or equal to the length of the scanning platform 210.

Figures 3, 4:
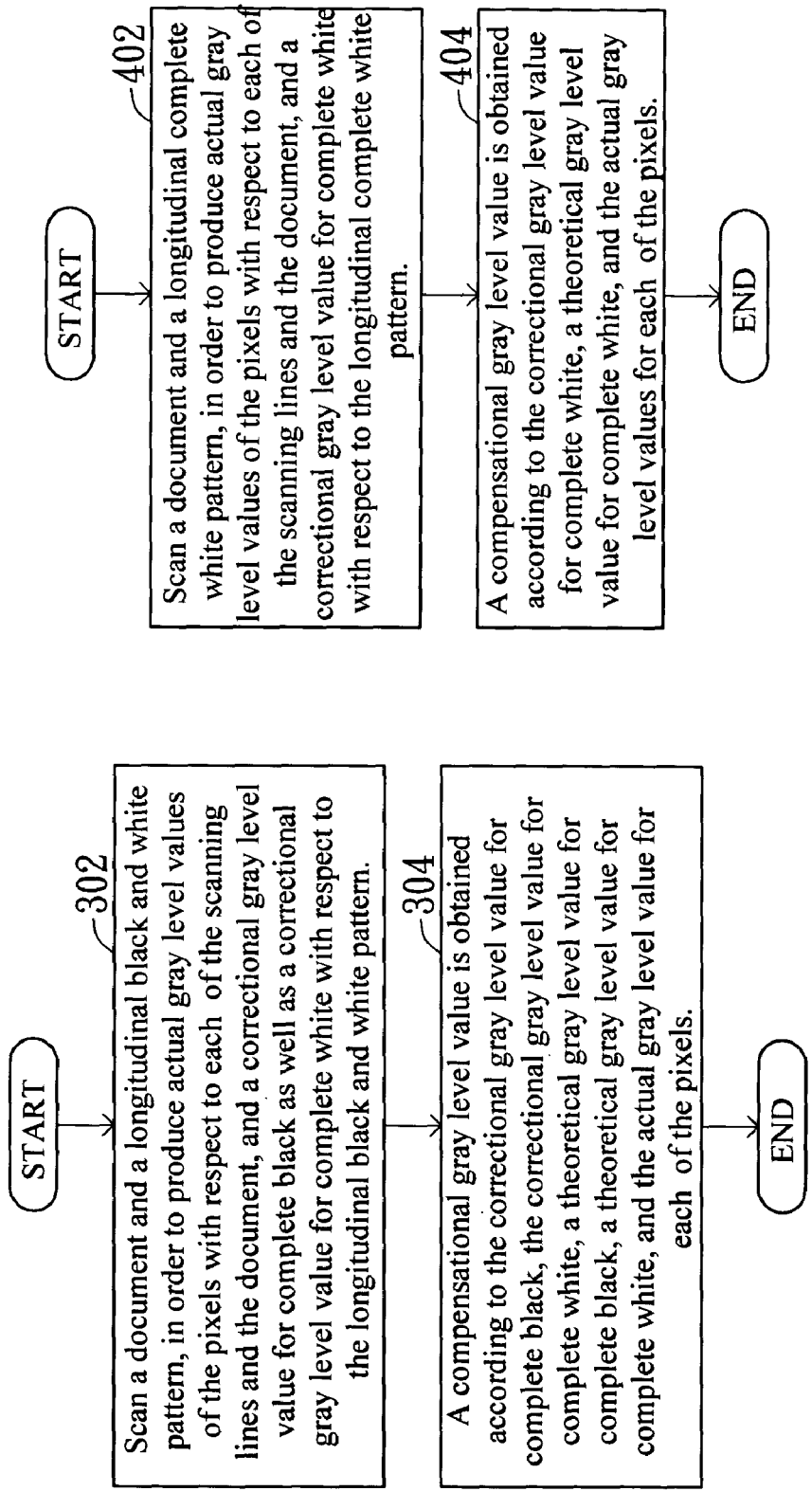
FIG. 3 is a flow diagram schematically illustrating an image compensating method according to a first preferred embodiment of the present invention.
FIG. 4 is a flow diagram schematically illustrating an image compensating method according to a second preferred embodiment of the present invention.

FIG. 3 is a flow diagram schematically illustrating an image compensating method according to a first preferred embodiment of the present invention. Also referring to FIG. 2 at the same time, as shown in FIG. 3, during step 302 multiple scanning lines are used first to scan a document 212 and a longitudinal black and white pattern 218, in order to produce the actual gray level value of multiple pixels with respect to each of the scanning lines and the document 212, and a correctional gray level value for complete black as well as a correctional gray level value for complete white with respect to the longitudinal black and white pattern 218.

The process then goes to step 304 during which a compensational gray level value with respect to the actual gray level value for each of the pixels is obtained according to the correctional gray level value for complete black, the correctional gray level value for complete white, a theoretical gray level value for complete black, a theoretical gray level value for and complete white, and the actual gray level value for each of the pixels. Then, the process is complete. Wherein, a calculation in the embodiment is performed where [(each of the actual gray level values with respect to each of the pixels−the correctional gray level value for complete black)/(the correctional gray level value for complete white−the correctional gray level value for complete black)×(the theoretical gray level value for complete white−the theoretical gray level value for complete black)]. As a result, the compensational gray level value is obtained. If taking 8 bits as a standard, the gray level value will fall into a range of 0-255. In this embodiment, the theoretical gray level value for complete white and the theoretical gray level value for complete black are set at 255 and 0, respectively.

If the longitudinal black and white pattern 218 in FIG. 2 is changed to a longitudinal complete white pattern, the present invention also provides another image compensation method, as shown in FIG. 4. In FIG. 4, during step 402, multiple scanning lines are used first to scan a document and a longitudinal complete white pattern, in order to produce the actual gray level value for each of multiple pixels with respect to each of the scanning lines and the document, as well as a correctional gray level value for complete white with respect to the longitudinal complete white pattern. The process then goes to step 404, where a compensational gray level value with respect to the actual gray level value for each of the pixels is obtained according to the correctional gray level value for complete white, a theoretical gray level value for complete white, and the actual gray level value for each of the pixels. Then, the process is complete. Wherein, a calculation in the embodiment is performed where [each of the actual gray level values with respect to each of the pixels×(the theoretical gray level value for complete white/the correctional gray level value for complete black)]. As a result, the compensational gray level value is obtained. If taking 8 bits as a standard, the gray level value will fall within a range of 0-255. In this embodiment, the theoretical gray level value for complete white and the theoretical gray level value for complete black are set at 255 and 0, respectively.

Figure 5:
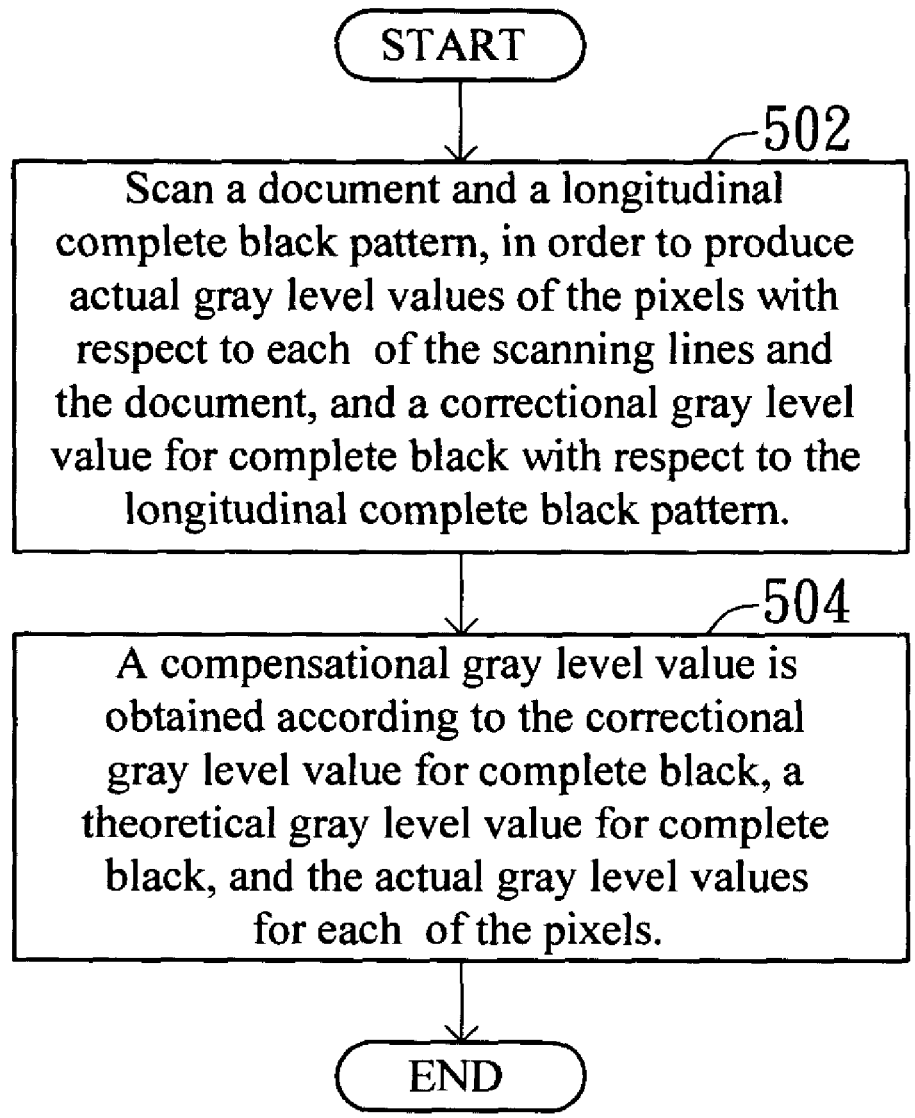
FIG. 5 is a flow diagram schematically illustrating an image compensating method according to a third preferred embodiment of the present invention.

If the longitudinal black and white pattern 218 in FIG. 2 is changed to a longitudinal complete black pattern, the present invention also provides another image compensation method, as shown in FIG. 5. In FIG. 5, during step 502, multiple scanning lines are used first to scan a document and a longitudinal complete black pattern in order to produce the actual gray level value with respect to each of the scanning lines and the document, as well as a correctional gray level value for complete black with respect to the longitudinal complete black pattern. The process then goes to step 504, where a compensational gray level value with respect to the actual gray level value for each of the pixels is obtained according to the correctional gray level value for complete black, a theoretical gray level value for complete black, and the actual gray level value for each of the pixels. Then, the process is complete. Wherein, a calculation in the embodiment is performed where [each of the actual gray level values with respect to each of the pixels−(the correctional gray level value for complete black−the theoretical gray level value for complete black)]. As a result, the compensational gray level value is obtained. If taking 8 bits as a standard, the gray level value will fall within a range of 0-255. In this embodiment, the theoretical gray level value for complete white and the theoretical gray level value for complete black are set at 255 and 0, respectively.

In conclusion, the image compensating method has been disclosed by the foregoing embodiments of the present invention. By comparing the correctional gray level value for complete black or complete white, which is the measurement on the patterns of longitudinal black and white, complete white, or complete black, with theoretical gray level value for complete black or complete white, the image brightness obtained by the scanner is adjusted. At the same time, the light brightness errors that occur due to the light intensity needed by the scanning operation or due to the disturbance of the scattering light from the environment can be compensated. The scanning quality can also be maintained at a high level.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. An apparatus comprising:
   means for scanning a document and a calibration pattern at the same time along a scanning path, wherein the means for scanning comprises one or more scan lines;
   a top;
   a scanning chassis configured to be movable under the top along the scanning path, wherein the scanning chassis comprises the scanning element:
      a scanning platform disposed at the top, wherein the scanning platform is configured to support the document above the scanning chassis, wherein the calibration pattern is positioned on the top along a lateral side of the scanning platform and extends continuously along substantially an entire length of the scanning path;
   means for obtaining actual gray level values from the scanned document and obtaining a correctional gray level value for white and a correctional gray level value for black from the scanned calibration pattern, wherein the actual gray level values and the correctional gray level values are obtained along the one or more scan lines;
   means for determining a compensational gray level value for pixels of the scanned document based on an actual gray level value for each of the pixels and the correctional gray level values, wherein determining the compensational gray level value for each of the pixels comprises calculating [(each of the actual gray level values with respect to each of the pixels−the correctional gray level value for black)÷(the correctional gray level value for white−the correctional gray level value for black) * (a theoretical gray level value for white−a theoretical gray level value for black)]; and means for compensating a gray level of the scanned document using the compensational gray level value.

2. The apparatus of claim 1, wherein the means for scanning is further configured to continuously scan both the calibration pattern and the document while moving longitudinally along the scanning path.

3. The apparatus of claim 1, wherein the calibration pattern comprises a black pattern and a white pattern that are each elongated in a direction parallel with the scanning path and wherein the means for compensating is further configured to determine the correctional gray level value for black from the black pattern and the correctional gray level value for white from the white pattern.

4. The apparatus of claim 1, wherein the calibration pattern comprises a black pattern, and wherein the means for compensating is further configured to determine the correctional gray level value for black from the black pattern.

5. The apparatus of claim 1, wherein the calibration pattern comprises a white pattern, and wherein the means for compensating is further configured to determine the correctional gray level value for white from the white pattern.

6. The apparatus of claim 1, wherein a length of the calibration pattern is equal to or greater than a length of the scanning path.

7. An apparatus comprising:
   a scanning element configured to be moveable in a document scanning direction;
   a scanning platform configured to support a document;
   a reference pattern disposed adjacent to the scanning platform, wherein the reference pattern is at least as long as the scanning platform in the document scanning direction; and
   a processor configured to:
      determine actual gray level values for pixels of a scanned image of the document;
      determine a correctional gray level value for white and a correctional gray level value for black based, at least in part, on a scanned image of the reference pattern, wherein the reference pattern and the document are scanned at the same time;
      determine a compensational gray level value for the pixels of the scanned image based at least in part on an actual gray level for each of the pixels and the correctional gray level, wherein determining the compensational gray level value for each of the pixels comprises calculating [(each of the actual gray level values with respect to each of the pixels−the correctional gray level value for black)÷(the correctional gray level value for white−the correctional gray level value for black) * (a theoretical pray level value for white−a theoretical gray level value for black)]; and
      compensate the scanned image using the compensational gray level value.

8. The apparatus of claim 7, wherein the reference pattern comprises a continuous black pattern elongated in a direction parallel with the document scanning direction and a continuous white pattern elongated in a direction parallel with the document scanning direction and positioned adjacent to the continuous black pattern, and wherein the processor is further configured to determine the correctional gray level value for black from the continuous black pattern and determine the correctional gray level value for white from the continuous white pattern.

9. The apparatus of claim 7, wherein the reference pattern comprises a continuous black pattern, and wherein the processor is further configured to determine the correctional gray level value for black from the continuous black pattern.

10. The apparatus of claim 7, wherein the scanning element is configured to continuously scan both the reference pattern and the document along a scanning path associated with the scanning element.

11. The apparatus of claim 7, wherein the reference pattern comprises a continuous white pattern, and wherein the processor is further configured to determine the correctional gray level value for white from the continuous white pattern.

12. The apparatus of claim 7, wherein a length of the reference pattern is parallel to the scanning direction and equal to or greater than a length of the scanning platform.

13. A method performed by a scanner, comprising:
   scanning, with a scanning element of the scanner, a document to determine a plurality of actual gray level values for a plurality of pixels scanned from the document, wherein the scanning element is configured to scan the document along a scanning path associated with the scanner;
   scanning, with the scanning element, a continuous longitudinal calibration pattern while scanning the document to determine a correctional gray level value for white, wherein the scanning element is configured to concurrently scan both the calibration pattern and the document at multiple positions along the scanning path;
   scanning a second continuous longitudinal calibration pattern while scanning the document to determine a correctional gray level for black;
   determining a compensational gray level value with respect to an actual gray level value for each of the pixels, wherein the compensational gray level value is based at least in part on the correctional gray level value and the actual gray level value for each of the pixels scanned from the document, and wherein determining the compensational gray level value for each of the pixels comprises calculating [(each of the actual gray level values with respect to each of the pixels−the correctional gray level value for black)÷(the correctional gray level value for white−the correctional gray level value for black) * (a theoretical gray level value for white−a theoretical gray level value for black)]; and compensating for image brightness in a scanned image of the document using the compensational gray level value for each of the pixels.

14. The method according to claim 13, wherein the scanner comprises:
   a top;
   a scanning chassis configured to be movable under the top along the scanning path, wherein the scanning chassis comprises the scanning element; and
   a scanning platform disposed at the top, wherein the scanning platform is configured to support the document above the scanning chassis, wherein the calibration pattern is positioned along a lateral side of the scanning platform and extends continuously along substantially an entire length of the scanning path.

15. A method performed by a scanner including a top, a scanning chassis, and a scanning platform, wherein the method comprises:
   scanning, with a scanning element of the scanner, a document and a continuous longitudinal white pattern, wherein the scanning element is configured to continuously scan both the document and the longitudinal white pattern, at the same time, along a scanning path associated with the scanner, wherein the scanning chassis is configured to be movable under the top along the scanning path, wherein the scanning chassis comprises the scanning element, wherein the scanning platform is configured to support the document above the scanning chassis; and wherein the longitudinal white pattern is positioned on the top along a lateral side of the scanning platform and extends continuously along substantially an entire length of the scanning path;
   determining a plurality of actual gray level values for a plurality of pixels scanned from the document;
   determining a correctional gray level value for white based at least in part on the longitudinal white pattern;
   determining a compensational gray level value with respect to an actual gray level value for each of the pixels based at least in part on the correctional gray level value for white, a theoretical gray level value for white, and the actual gray level value for each of the pixels, wherein determining the compensational gray level value for each of the pixels comprises calculating [each of the actual gray level values with respect to each of the pixels * (the theoretical gray level value for white+the correctional gray level value for white)]; and
   compensating a scanned image of the document using the compensational gray level value for each of the pixels.

16. The method of claim 15, wherein the correctional gray level value for white is determined at the same time as at least one of the plurality of actual gray level values.

17. A method performed by a scanner including a top, a scanning chassis, and a scanning platform, wherein the method comprises:
   scanning, with a scanning element of the scanner, a document and a continuous longitudinal black pattern, wherein the scanning element is configured to simultaneously scan both the document and the longitudinal black pattern, at the same time, along a scanning path associated with the scanner, wherein the scanning chassis is configured to be movable under the top along the scanning path, wherein the scanning chassis comprises the scanning element, wherein the scanning platform is configured to support the document above the scanning chassis; and wherein the longitudinal black pattern is positioned on the top along a lateral side of the scanning platform and extends continuously along substantially an entire length of the scanning path;
   determining a plurality of actual gray level values for a plurality of pixels from the document;
   determining a correctional gray level value for black based at least in part on the longitudinal black pattern;
   determining a compensational gray level value with respect to an actual gray level value for each of the pixels based at least in part on the correctional gray level value for black, a theoretical gray level value for black, and the actual gray level value for each of the pixels, wherein determining the compensational gray level value for each of the pixels comprises calculating [each of the actual gray level values with respect to each of the pixels−(the correctional gray level value for black−the theoretical gray level value for black)]; and
   compensating a scanned image of the document using the compensational gray level value for each of the pixels.

* * * * *

UNITED STATES PATENT AND TRADEMARK OFFICE
CERTIFICATE OF CORRECTION

PATENT NO. : 8,194,290 B2  
APPLICATION NO. : 10/662258  
DATED : June 5, 2012  
INVENTOR(S) : Kuo Page 1 of 1

It is certified that error appears in the above-identified patent and that said Letters Patent is hereby corrected as shown below:

On the Face Page, in Field (74), under "Attorney, Agent, or Firm", in Column 2, Line 1, delete "Coweger" and insert -- Cowger --, therefor.

In Column 5, Line 9, in Claim 1, delete "element:" and insert -- element; --, therefor.

In Column 6, Line 18, in Claim 7, delete "pray" and insert -- gray --, therefor.

In Column 8, Line 6, in Claim 15, delete "white+the" and insert -- white÷the --, therefor.

Signed and Sealed this
Twentieth Day of November, 2012

David J. Kappos
*Director of the United States Patent and Trademark Office*